US006942443B2

(12) United States Patent
Shubert

(10) Patent No.: US 6,942,443 B2
(45) Date of Patent: Sep. 13, 2005

(54) WHEEL-LIFT DEVICE WITH TONGUE FOR TOWING VEHICLES

(76) Inventor: Arden Royce Shubert, 1920 Sheely Dr., Fort Collins, CO (US) 80526

( * ) Notice: Subject to any disclaimer, the term of this patent is extended or adjusted under 35 U.S.C. 154(b) by 136 days.

(21) Appl. No.: 10/294,258

(22) Filed: Nov. 14, 2002

(65) Prior Publication Data

US 2004/0096305 A1 May 20, 2004

(51) Int. Cl.[7] .................................................. B60P 3/75
(52) U.S. Cl. ........................ 414/563; 414/648; 280/502
(58) Field of Search ................................ 414/563, 648, 414/482; 280/491 D, 502

(56) References Cited

U.S. PATENT DOCUMENTS

| | | | | | |
|---|---|---|---|---|---|
| 3,182,829 | A | | 5/1965 | Wagner | |
| 3,690,482 | A | * | 9/1972 | Gaumont et al. | 414/563 |
| 3,806,162 | A | * | 4/1974 | Milner | 280/502 |
| 3,885,815 | A | * | 5/1975 | Kniff | 280/402 |
| 4,013,303 | A | * | 3/1977 | Milner | 280/491.4 |
| 4,266,800 | A | * | 5/1981 | Hawkins | 280/491.4 |
| 4,488,735 | A | * | 12/1984 | Hehr | 280/656 |
| 4,534,579 | A | * | 8/1985 | Shackelford, Sr. | 280/402 |
| 4,856,799 | A | * | 8/1989 | Hawn | 280/24 |
| 5,540,540 | A | * | 7/1996 | Peterson | 414/563 |
| 5,709,522 | A | * | 1/1998 | Cullum | 414/563 |
| 5,762,465 | A | * | 6/1998 | Zackovich | 414/563 |
| 5,779,431 | A | | 7/1998 | Alm | |

OTHER PUBLICATIONS

Jack Schrock, "Mas Grande" Write Carrier & Wrecker Quarterly Winter 2002, p 20, vol. 11 No. 1, Jerr–Dan Corporation, Greencastle, PA 17225.
Transporting Cargo Safely, Colorado Commercial Driver License Manual, 2002, p 3–41 & 42, Colorado Department of Transportation, Denver, CO 80202.
Advertisement, "The Solution", 1996 Tru–Hitch, Torrington, CT 06790.
Catalog, "OMNI only by Weber", Apr. 2002, p 14, 15, 17, and back cover, Weber Manufacturing, Elkhart, IN 46515.
Bill Jackson, "Where's The Hitch?" Towing and Recovery Footnotes, Nov. 2002, p 1, vol. 14 No. 6, Trader Publishing Co, Norfolk, VA 23510.

* cited by examiner

*Primary Examiner*—Eileen D. Lillis
*Assistant Examiner*—Charles A. Fox

(57) ABSTRACT

A wheel lift hitch device for towing a vehicle, particularly a hitch that is assembled from several components to surround and carry an axle of a vehicle to be towed, in which the device becomes a rigid appendage to that vehicle. The appendage serves as a tongue to hitch vehicle to a tow truck with both horizontal and vertical axes at the hitch of the tow truck.

6 Claims, 9 Drawing Sheets

24
150
36a
30a
34
150
72a
78L
112L
100c
32c
132a
120
118
130
122
42
40
134
126
50b
132a
110
30a
78L
114a
74
74
30a
32c
30a
116a
100c
108
112R
78R
78R
70
34
150
72a
150
36a
30a

WHEEL-LIFT DEVICE WITH TONGUE FOR TOWING VEHICLES

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of the Invention

This invention relates to a wheel-lift device for towing vehicles, and particularly to a device assembled from several parts that surround an axle of a vehicle to be towed, in which the device becomes a rigid appendage to that vehicle and, having that appendage serve as a tongue to hitch to a second vehicle, allows the first vehicle to be towed by the second as a two-wheel cart.

2. Background of the Invention

Wheel-lift towing of vehicles has a history of less than four decades. Wagner, U.S. Pat. No. 3,182,829, May 1965, gave us a vehicular lifting yoke. His yoke taught us to use the axle of the towed vehicle as the horizontal axis for articulation between the towed and towing vehicle. It remains common practice to date.

That design has an inherent problem. The location of the horizontal pivot determines the location of where the weight of the towed vehicle is transferred to the tow truck. That design carries all of the cargo weight some distance behind the axle and the weight of the wheel lift equipment as well is carried behind the truck's axle in most similar designs. Truck builders prefer that a truck's load be carried between the axles or close to the rear axle. A recommended ratio of no more than forty percent of cargo weight should be carried behind the axle.

Earlier wreckers, especially before about 1980, used a tow bar or a sling that attached to the bumper or the end of the frame of the towed vehicle. The weight of the vehicle was carried by the wrecker at the tow bar that had a working position of several feet behind the end of the truck. In comparison that is about half the distance from the axle that many wheel lifts carry their load. To compensate for this shift of the load rearward, wreckers are generally at least one and a half times the length of earlier tow trucks and weigh substantially more.

State commercial drivers license manuals teach drivers that they are responsible for their load and that poor distribution of weight can make vehicle handling unsafe. Tow truck operators are generally required to have commercial drivers licenses and to know these rules. It seems inevitable that towmen will be summoned to court sometime in the future for knowingly operating unsafe vehicles.

The industry seems aware of the challenges it faces carrying towing loads far behind tow trucks' rear axles but it appears to have not yet found a solution that addresses the weight transfer problem. An example appears in the Winter 2002 edition of the *Write Carrier & Wrecker Quarterly*, Volume 11, Number 1, Page 20, a publication of the Jerr-Dan Corporation, a major manufacturer of towing equipment.

This article describes a user's need for equipment to tow a fire truck with a front axle weight of 21,350 pounds, a front axle set back of 10 feet from the front bumper, and the fire truck having a bucket and snorkel assembly that extends 7 feet ahead of the front bumper. The fire trucks have low hanging components within the underbelly of the fire truck that the towing boom needs to pass under without contact when turning. The manufacturer only approves the axle as a pickup point. The fire trucks are too high to transport on trailers.

This customer's problem invites a comparison between the industry's state of art and the present invention. Their solution was to use a modified heavy duty Underlift carrying the fire truck by the axle using a four stage rigid boom extending behind the truck's tri-axles. The 21,350 pound front axle load of the fire truck is carried about 20 feet behind the center of the tow trucks rear suspension. The rigid lifting boom acts as a lever increasing the 21,350 pound axle weight on the Underlift's axles. Wrecker trucks have a high tare weight. The combined load exceeds the tri-axle legal load weight. The article acknowledges that this combination will be an oversize, over-height, and overweight load.

The present invention shifts both horizontal and vertical axes between the tow truck and the fire truck from the rear of the lifting arm to the front of that arm. The action of the lever on this wheel lift hitch device arm transfers most of the front axle weight to the tow truck, but a percentage of that weight will be transferred to the rear axles of the towed unit. In this example the fire truck could be towed using the present invention by a tandem axle tractor equipped with a pintle hook hitch and be of legal axle weight on the tow truck's axles. The present invention has no arm that pivots under the load. The load may be carried lower because less clearance beneath the truck is required and the towed load may be under legal height limits. A shorter tow truck can be used because it is not necessary to have excessive tow truck length to counter-balance a load carried far behind the axles of the tow truck. The combination can be within legal length requirements.

An additional problem with the present designs of wheel lift tow trucks of all sizes and classes is that all carry the load at the end of a boom behind the truck axle. The boom serves as a lever. A lever amplifies motion and force. That amplified motion can cause movement and forces in excess of design capability of the towed vehicle. An irregular or undulating road surface can cause extreme vertical movement in the suspension of the towed vehicle carried on a wheel lift and retained to that boom and can result in damage to that vehicle.

To avoid some of this damage users can raise the boom to relatively high angles from horizontal to provide more clearance between the boom, its pivot, and drive train components of the towed vehicle. This action causes a different problem. Many tow truck designs advertise a wheel lift boom angle of 10 to 15 degrees above horizontal. When a boom is raised to that angle, the pivot pin between the boom and the transverse bar of the wheel lift also tilts forward at a like angle. The forward tilt of the transverse bar's pivot pin causes the towed vehicle to warp in a turn in relation to the attitude of the tow truck. The actual warp between the inside and outside ends of the transverse bar in a 45 degree turn may be 12 inches or more when the boom is carried at these angles. Cullum, U.S. Pat. No. 5,709,522, January 1998, introduced a double pivot crossbar "capable of rotational movement in both horizontal and vertical planes permitting stress reduction in both the tow truck assembly and the tow truck chassis . . . " Presumably it may also reduce stress and possible damage to the towed vehicle because cars are never as built as strong as towing equipment.

Available alternatives to a wheel lift tow truck are limited. Car carriers are widely used by professional towing operators. Their size is generally a disadvantage. Three car lengths of space are generally required to load or unload a car carrier compared to two car lengths of space with most wheel lift trucks. That space requirement can limit the efficiency of a car carrier in an urban environment. A second problem with car carriers is the difficulty of damage free loading of a vehicle with front wheels locked at an angle. Force rather than finesse generally prevails and the locked vehicle is dragged onto a truck causing strain on mechanical components. Alm, U.S. Pat. No. 5,779,431, July 1998, introduced a wheel loading device used on a car carrier body to facilitate damage-free loading. It appears to be the only wheel lift design at this time that carries its load primarily between the axles of the truck during transport.

Car dollies also carry vehicles on their own wheels and suspension. Car dollies have only limited capabilities for handling damaged or inoperable vehicles. Most designs include two vertical axes, one at the hitch and a second at the wheels of the towed vehicle. Few operators are able to back up such a combination and commercial use is therefore limited.

A wheel lift device seldom seen in the United States is a truck mounted rotating boom equipped with a rotating lift frame at its outer end. The lift frame is maneuvered over the vehicle and wheel supports attached to the lift frame are placed under each wheel. The vehicle is then hoisted onto the truck body. It appears to be an especially efficient approach for the damage-free removal of illegally parked vehicles.

An under-lift towing device that uses the fifth wheel of a semi-truck tractor as horizontal and vertical axes was introduced to the industry in about 1990. "Tru-Hitch" has arms that lift an axle and extend rearward from that axle to attach to the vehicle frame. Its operation appears to be still new to the industry. The November 2002 issue of *Towing & Recovery FOOTNOTES*, Volume 14, Number 6, a widely distributed "community newspaper and marketplace for the nation's towers," pictured a loaded "Tru-Hitch" in a front page article that questioned how it claimed to work without transferring weight from the truck's front axle. The writer, identified as a consultant to the heavy recovery industry, reflects the longstanding industry wide perception that the horizontal pivot can only be located at the axle of the towed vehicle.

There appears to be little precedent in the marketplace or in literature for a wheel-lift for towing that does not use the vehicle wheels as a horizontal axis. A wheel-lift device does not appear to have been used to immobilize wheels to support a fixed tongue. A wheel-lift hitch with a tongue does not appear to have been used to transfer both horizontal and vertical axes to a point ahead of the towed vehicle. Rather the history of wheel-lift towing has been built almost entirely on the aforementioned Wagner patent of 1965.

Devices for lifting a heavy tongue from the ground into a towing hitch on a truck are readily available and in widespread use, especially in the modular and mobile home transporting business. Charles Weber, U.S. Pat. No. 4,000,911, January 1977, introduced a hitch head that was hydraulically adjustable laterally, vertically, and longitudinally. Randall Weber, U.S. Pat. No. 4,946,182, August 1990, followed with an even more versatile boom type hitch. Those, and other hitches with similar capability, are readily adaptable for use with the present invention. Strap winches integral within small booms will offer a convenient and lightweight solution for raising the tongue to a hitch for many users.

The present invention is usually attached to the vehicle to be towed before it is attached to the tow truck so this hitch device conforms to all terrain conditions. The tow truck or the carrier attaches only to the hitch device. Powered wheel lifts often cause damage. Young, U.S. Pat. No. 5,951,235, September 1999, describes problems that all in the industry face and offers a powered solution to it. The present invention, a manually maneuvered hitch device, is powerless to cause damage to a vehicle and can perform similar tasks.

Under the best conditions tow truck operation is seldom without some physical effort. Sophisticated self-loading towing equipment requires the operator to check and perhaps secure the load before departing on a high-speed tow on public roadways. Most towing units still require installation of wheel chocks and retaining straps or chains. The present invention recognizes that fact and includes such tasks in the assembly of the wheel lift hitch onto the vehicle to be towed. Many wreckers and tow trucks now carry towing dollies that require assembly, often at accident scenes. Light duty embodiments of the present invention will be comparable in weight to the advertised weights of towing dollies and will require about the same time and effort to assemble.

It is understood that this device is adaptable to any hitch design that has an adequate vertical load rating in addition to adequate towing capacity. Pintle hooks and a variety of 5th wheel hitches are preferred over most ball hitches that are limited by low vertical load ratings. Gooseneck hitch adaptors can be used with models that have an adjustable length tongue and will offer better load transfer at some cost to convenience.

BACKGROUND OF INVENTION

Objects and Advantages

The main object of this invention is to provide a wheel lift device that, without moving parts and when assembled around wheels on an axle of a vehicle, becomes an appendage to that vehicle which can be used as a tongue to tow the vehicle as a cart behind a tow truck and to carry that vehicle on its own suspension.

A second object of the invention is to introduce a universal wheel lift hitch that can be used to lift and carry one axle of almost any vehicle having at least 2 axles with wheels.

A third object of the invention is to provide an automotive wheel lift device to the industry that is as easy to assemble as a car dolly regularly used by those in the industry and of comparable or less weight.

Another object of the invention is to introduce a wheel lift design that reduces the distance that the towing load is carried behind the axle of the tow truck thus providing safer and improved handling characteristics for the tow truck.

An additional object of the invention is to create a design that can be easily manufactured without specialized machinery.

A further object of the invention is to create a tool with simple and logical design, the proper use of which might be taught to almost any user without extensive repetition.

Additional objects and advantages of this invention will be set forth in the following description. They will in part be obvious from the description or may be learned by practice of the invention.

SUMMARY

The present invention provides a wheel-lift hitch that is assembled around a vehicle axle and carries vehicle on that axle. Chains are attached to vehicle in a scheme that can compress its suspension and hold vehicle stable in hitch so it becomes a fixed tongue to that vehicle thereby allowing that vehicle to be towed as a two-wheel cart by a tow truck

BRIEF DESCRIPION OF THE SEVERAL VIEWS OF THE DRAWING

REFERENCE NUMERALS IN DRAWINGS

Figure 1:
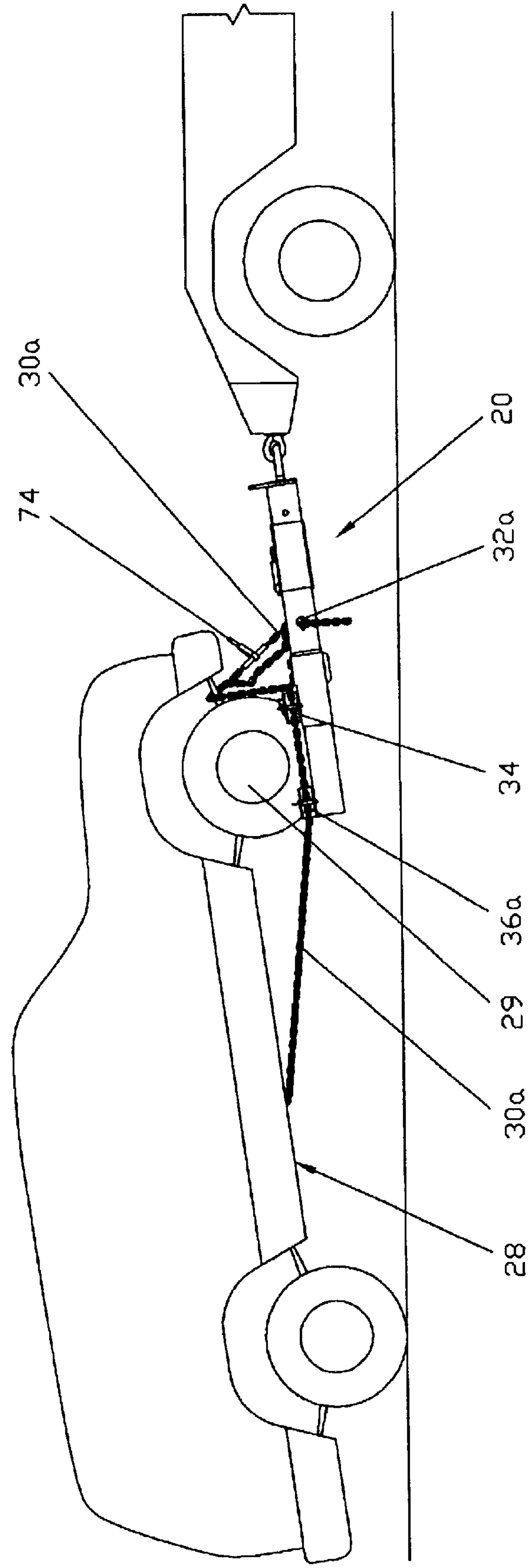
FIG. 1 is a two-dimensional side view of the present invention in towing position.

20 First hitch device
22 Second hitch device
24 Third hitch device
26 Fourth hitch device
28 Towed vehicle
29 Vehicle axle
**30*a*** First chain—single
**30*b*** Second chain—front
**30*c*** Third chain—rear
**32*a*** First chain latch—folding arm
**32*b*** First chain latch—hitch housing
**32*c*** First chain latch—second arm
34 Second chain latch
**36*a*** Third chain latch—leg
**36*b*** Third chain latch—beam
38 Fourth chain latch
40 Hitch
42 Lifting loop
44 First hitch housing
46 Anchor pin
48 Spring
**50*a*** Boss—inside housing
**50*b*** Boss—outside housing
52 Wedge lock
54 Wedge lock handle
56 Hinged flap
58 Flap latch
**60*a*** Folding arm—front
**60*b*** Folding arm—rear
62 Folding arm brackets
**64*a*** Arm mounting holes—front
**64*b*** Arm mounting holes—rear
66 Arm pivot pin
**68*a*** Boss latch hole—folding arm
**68*b*** Boss latch hole—second arm
70 Socket
**72*a*** Load binder anchor—single
**72*b*** Load binder anchor—double
74 Chain load binder
76 First beam
78L Leg assembly—left
78R Leg assembly—right
80 Tongue arm assembly
82 Hinged arm
84 Hinge and socket
86 Arm hinge pin
88 Jack ram brackets
90 Jack ram
**92*a*** Jack ram pivot pin—front
**92*b*** Jack ram pivot pin—rear
94 Hose coupler
96 Hydraulic hand pump with hose
**98*a*** Plunger lock hole—hinged arm
**98*b*** Plunger lock hole—mounting lug
**100*a*** Plunger lock—front
**100*b*** Plunger lock—rear
**100*c*** Plunger lock—wheel chock
102 Second hitch housing
104 Hinged arm mounting lug
106 Flange attachment holes
108 Second beam assembly
110 Transverse beam
112L Wheel chock assembly—left
112R Wheel chock assembly—right
**114*a*** Beam attachment holes—inner
**114*b*** Beam attachment holes—outer
**116*a* Second pin—2*d*** arm with lugs
**116*b* Second pin—2*d*** arm with gudgeon
118 First Arm
120 First arm adjustment holes
122 Third hitch housing
124 Channel
126 Web

128 Slot
130 First Pin
132*a* Second arm—with lugs
132*b* Second arm—with gudgeon
134 Cleat
136 Third beam
138 Beam mounting brackets
140 Lateral leg
142 Fourth beam
144 Leg brackets
146 Pin slots
148 Third pin
150 Lock pin
152 Lock hole

DETAILED DESCRIPTION

Basic Embodiment—FIGS. 1–6

FIG. 1 shows a side view of the basic embodiment of the present invention, a first hitch device 20, attached to a tow truck and carrying towed vehicle 28. Chains 30*a*, attached to towed vehicle 28 at each side of chassis as near as practical to the rear axle, course forward through third chain latches 36*a* and beyond through second chain latches 34, supporting towed vehicle's axle 29 in first hitch device 20, and chains 30*a* holding all in suspension. Chains 30*a* continue upward across the front tire surfaces and over a suspension or chassis component, then downward and forward to first chain latches 32*a* and held taut there by chain load binders 74.

Figure 2:
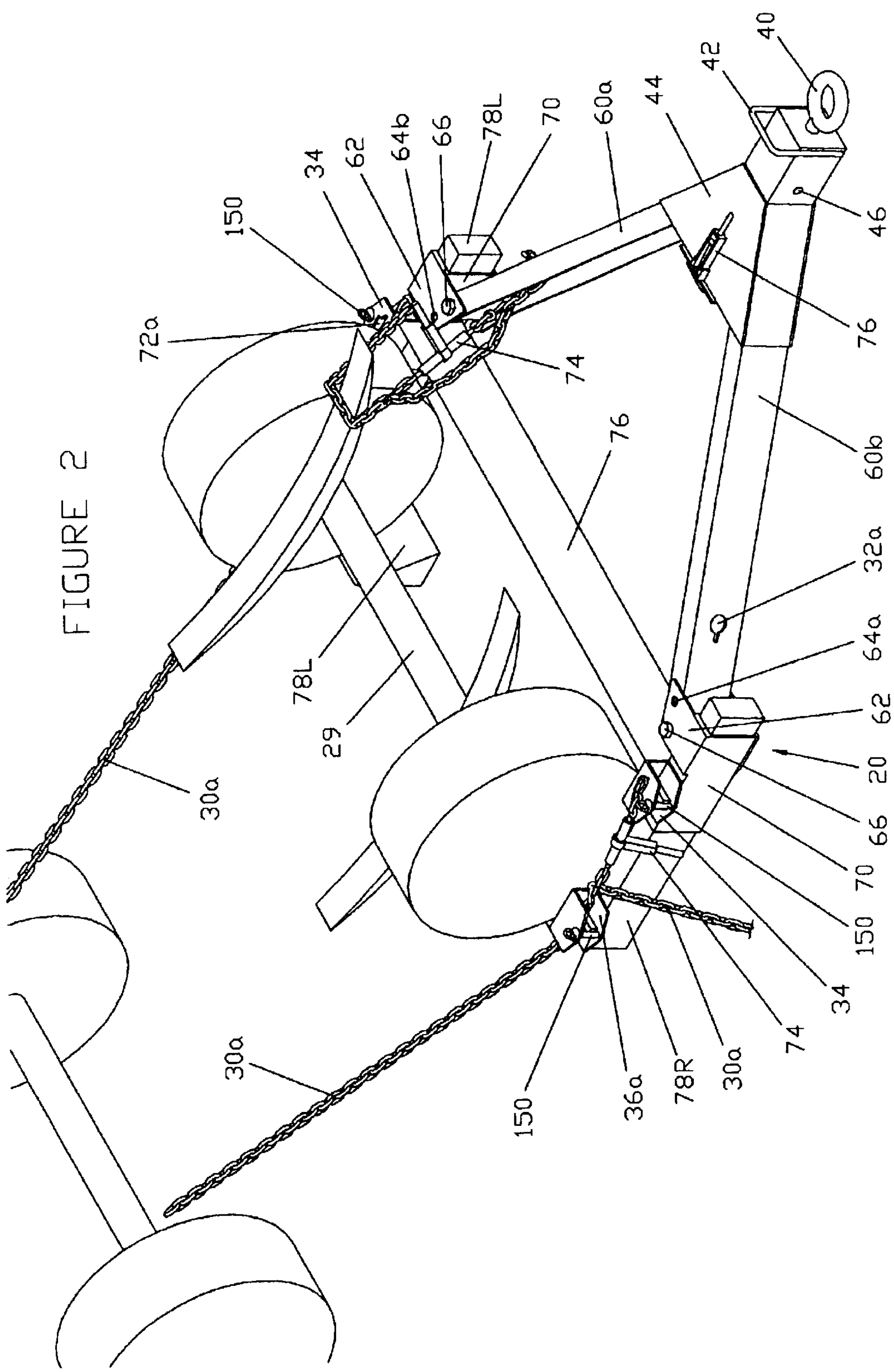
FIG. 2 is a perspective view of the basic embodiment of the present invention, a first hitch device showing the use of chain load binders and the chain scheme that secures hitch to a towed vehicle.

FIG. 2 is a perspective view of the basic embodiment of the present invention. First hitch device 20 carries vehicle axle 29 at one end of a vehicle with the wheels of said axle suspended between transverse beam 76 and leg assemblies with wheel chocks 78L & R. Chains 30*a* are first attached to the chassis of the towed vehicle 28 and slack chain hooked into chain latches 36*a* mounted on leg assemblies 78L & R that telescope freely within sockets 70. Chains 30*a* are pulled taut by load binder 74 attached to anchor 72*a* and shown pulling right leg assembly 78R to transverse beam 76. Chain 30*a* will be latched into chain latch 34 and load binder 74 removed and reattached to chain 30*a* close to chain 32*a* and used there to tighten and hold chain 30*a* between hitch device 20 and vehicle 28. This is illustrated on the left suspension in FIG. 2.

Between chain latches 34 and 32*a* chain 30*a* is maneuvered over a suspension component or attached to the chassis of towed vehicle 28 by a link. Tension on this length of chain 30*a* provides the means to limit suspension travel and thereby restrict rotation between hitch and vehicle.

Load binder 74 is depicted as a ratcheting turnbuckle type. It is understood that different devices may be used to tighten chains, especially for light duty applications, to include ratcheting strap winches that are regularly used in the towing industry to tie vehicles to wheel lifts or car carriers. Load binder anchor 72*a* may be of a different form for different devices.

Figure 3:
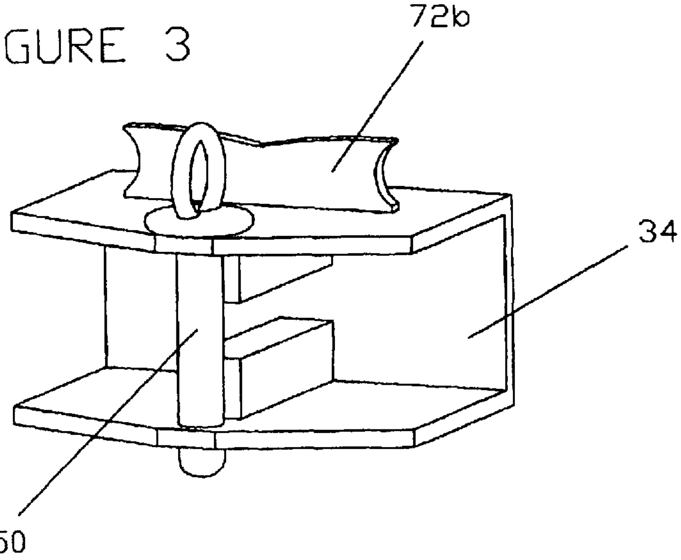
FIG. 3 is a perspective view of chain latch used in embodiments of this invention.

FIG. 3 provides a perspective view of the basic chain latch used in all embodiments. Second chain latch 34 is shown with load binder anchor 72*b*. Third chain latches 36*a* are mounted to legs and are integral with rear wheel chocks. Fourth chain latches 38 are vertically mounted on a transverse beam lower face and used in the fourth embodiment.

Figure 4:
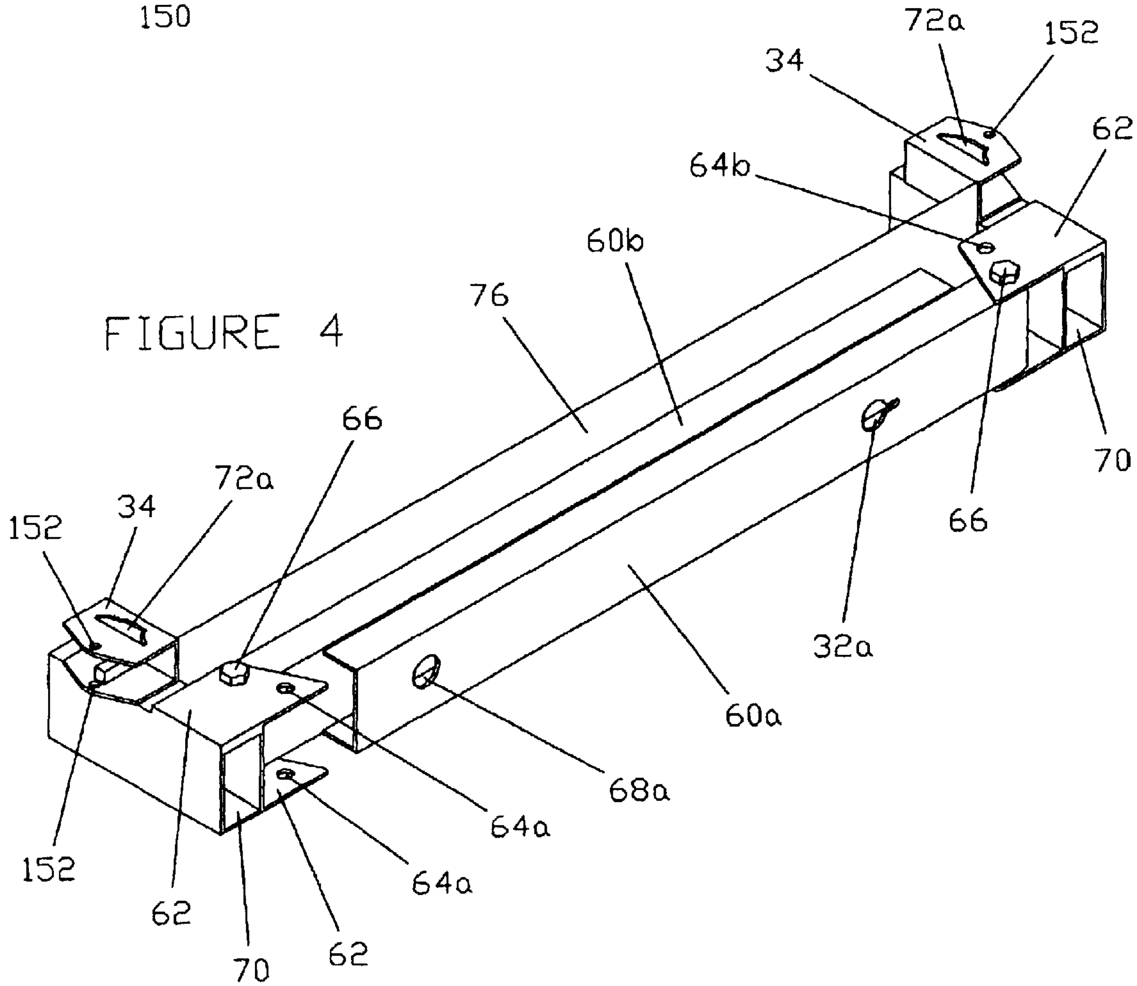
FIG. 4 is a perspective view of the transverse beam and tongue arms of the basic embodiment of the present invention when folded for storage or transport.

FIG. 4 shows first beam 76 with folding arms 60*a* & *b* hinged on pins 66 at their distal end. Brackets 62, fixed to top and bottom of sockets 70 at each end of first beam 76, serve as hinge plates and as gussets between sockets 70 and transverse beam 76. Folding arm 60*b* is a longer arm and folds for transport and storage against first beam 76 on pivot pin 66 inserted through the rear arm mounting hole 64*b*. Folding arm 60*a* is shorter and pivots from the opposite side when attached by pivot pin 66 through the front arm mounting hole 64*a* allowing it to fold across and ahead of folding arm 60*b* for transport. Folding arms 60*a* & *b* interchange from side to side by using alternate mounting holes 64*a* & *b*. Keyhole type first chain latches 32*a* are incorporated into folding arms to anchor chains 30*a* at the front of the hitch. First beam 76 serves as a wheel chock and, at each end, is a socket 70. Fixed above each socket 70 and facing outward is a second chain latch 34, illustrated in FIG. 3. Load binder anchors 72*a*, used to hold chain load binders 74 when pulling chains 30*a* taut before securing them into second chain latches 34, are fixed to latches' top surfaces.

Safety pins 150, identified in FIG. 3, inserted in lock holes 152 lock chain 30*a* into chain latches. Lifting loop 42 accommodates hooks from external lifting devices to raise first hitch device 20 into a hitch fixed to a towing vehicle.

Figure 5:
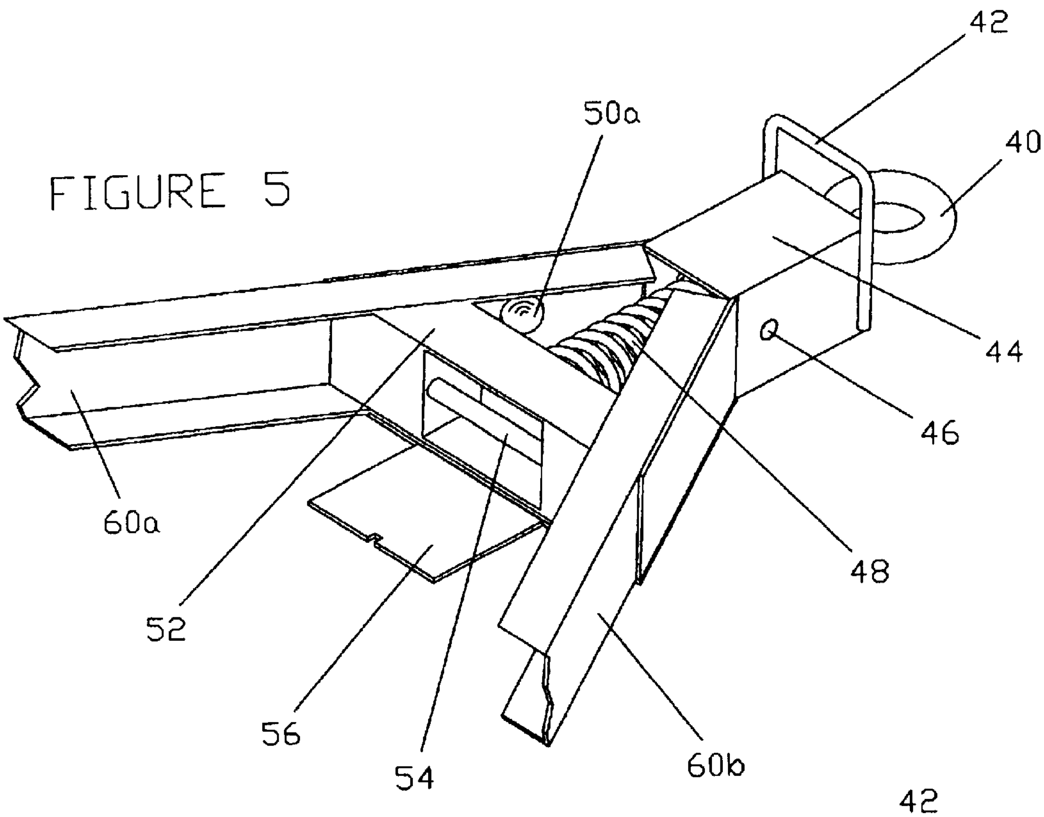
FIG. 5 is a perspective view of hitch housing of the basic embodiment without its top plate and arms locked in place by its wedge within the housing.
Figure 6:
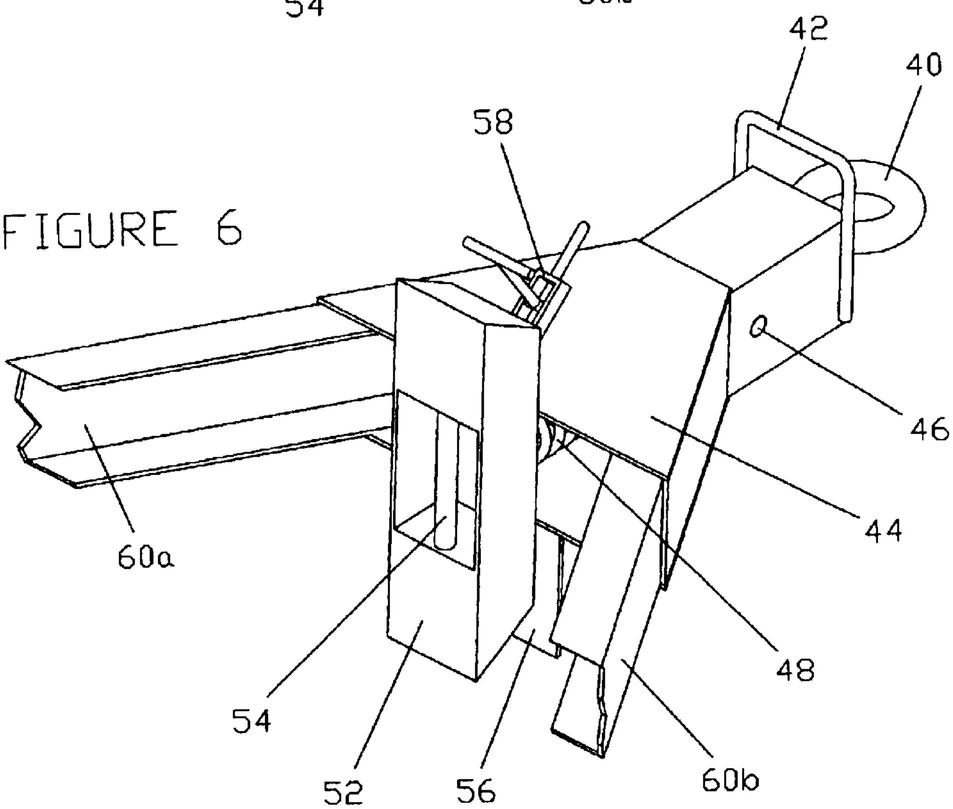
FIG. 6 is a perspective view of hitch housing of the basic embodiment with its wedge in an unlocked position for installation or removal of hitch arms.

FIGS. 5 and 6 show hitch 40 mounted at the front of hitch housing 44. Tongue folding arms 60*a* & *b* are joined within hitch housing 44 and retained laterally by round latch holes 68*a*, identified in FIG. 4, encircling bosses 50*a* that are fixed to each of the inner walls of hitch housing 44. Wedge lock 52, under tension by spring 48 stretching from spring anchor pin 46, is maneuvered within and against folding arms 60*a* & *b* to hold them against the inner walls of hitch housing 44. Hinged flap 56, attached to the bottom rear of the hitch housing 44, folds upward and is retained by flap latch 58, further securing wedge lock 52 within hitch housing 44.

The operation of the basic embodiment of the present invention requires assembly of eight components: a hitch housing, a beam and arm assembly, two leg assemblies, two chains, and two chain load binders. First hitch housing 44 is opened to accept folding arms 60*a* & *b* by unlatching flap latch 58 allowing hinged flap 56 to open one hundred eighty degrees. Using lifting loop 42 as one handle and wedge lock handle 54 as a second handle, wedge lock 52 is pulled back against the tension of coil spring 48 to a point that it can be rotated ninety degrees from the locked position.

Each of folding arms 60*a* & *b* are rotated away from first beam 76 approximately sixty degrees and inserted into rear of first hitch housing 44 to a point that each boss latch hole 68*a* engages bosses 50*a*. Wedge lock 52 is rotated ninety degrees to horizontal and released to engage folding arms 60*a* & *b* and force them against the inner walls of first hitch housing 44. Wedge lock 52 is then locked into place by hinged flap 56 secured by flap latch 58.

The partially assembled first hitch device 20 is manually maneuvered into position with first beam 76 placed against the front of each tire on vehicle axle 29. Skid shoes may be fixed to the outer bottom face of each socket 70 to facilitate maneuvering of the partially assembled hitch device over terrain. Each leg with wheel chock 78L & R is inserted into respective sockets 70 and wheel chocks are left a short distance from wheels. Each chain 30*a* is attached to the vehicle chassis at a tie down anchor provided by the manufacturer for securing vehicles to car carriers. Chains 30*a* are maneuvered forward into third chain latches 36*a*. A chain load binder 74 is attached to each load binder anchor 72*a* and to each chain 30*a* forward of third chain latch 36*a* providing the means to tighten both chain 30*a* and leg assemblies 78L & R. Chains 30*a* are secured into second chain latches 34 and load binders 74 are removed.

Chains 30*a* are maneuvered forward from second chain latch 34 across the front surfaces of tires on vehicle axle 29 and directly over a suspension or chassis component. Alternatively chains 30*a* may be indirectly connected to chassis by straps or other links to the towed vehicle. Chains 30*a* continue forward and downward to first chain latch 32 and there pulled taut and held by chain load binders 74. That action tightly secures tires between wheel chocks and restricts suspension travel. First hitch device 20 is then raised by an external lifting device attached to lifting loop 42 and maneuvered to connect hitch 40 into a compatible hitch on a tow truck.

This attachment scheme transfers the load to chains 30*a* as they pass through third chain latches 36*a*. Chains 30*a* also function to hold wheel chocks together when secured in both chain latches 36*a* and 34. Chains 30*a* are further used between chain latches 34 and 32*a*, and with chain load binders 74, to secure the front of towed vehicle 28 tightly within first hitch device 20. Leg assemblies 78L & R serve to counteract torque forces created by tongue folding arms 60*a* & *b* as they transfer load through first hitch housing 44 to hitch 40 attached to tow truck.

Safety pins 150 are inserted into lock holes 152 to secure chains 30*a* into chain latches 36*a* and 34. Chains 30*a* may be again tightened after vehicle axle assembly 29 is fully supported by first hitch device 20. Rotation on the horizontal axis between towed vehicle 28 and first hitch device 20 can be eliminated using chains 30*a* and load binders 74 to compress the suspension against its upper travel stops. Rotation can also be limited by park position of an automatic transmission or placing a manual transmission in gear for front wheel drive vehicles.

Practice will determine if some horizontal rotation, approximately five degrees, may be acceptable between first hitch device 20 and towed vehicle 28. Some rotation is expected to occur during hard braking by the tow truck if unrestrained. Vertical travel of vehicle axle 29 is otherwise dampened because it is suspended near the center between hitch 40 and the rear axle of the towed vehicle, thereby mitigating road shock to the axle.

The present invention is a universal tongue that can be quickly attached to tow almost any vehicle behind a variety of tow trucks. Elements for a vehicle to be towed by this device require two wheels that can be carried within a wheel lift and accessible and secure anchors to attach chains to the chassis of the vehicle at a point behind those wheels. Components are relatively light and can be manually maneuvered so damage to towed vehicles is minimized.

Several methods of lifting the tongue of hitch devices can be used with the several embodiments of this invention for vertical hitch loads ranging from an axle of a small car to a truck axle carrying maximum legal weight. The hitches are compatible with most commercial towing equipment used by auto wrecker, recovery, and towing companies using lifting loop 42 fixed to hitch housing 44. Older wrecker trucks equipped with towing slings or tow bars can be modernized using this wheel lift hitch. Car carriers can be retrofitted with this wheel lift hitch as a replacement for an auxiliary wheel lift, and using the carrier body and winch attached to a strap dropped over the end of the movable carrier body as the lifting device. The present invention offers towing capabilities for trucks equipped with knuckle boom loaders for wreck recovery. Six-way and boom type hitch equipment used for mobile home and manufactured housing towing are compatible for use with the present invention. A hand crank strap type winch can provide low cost lifting of light duty wheel lift hitch devices.

Figure 7:
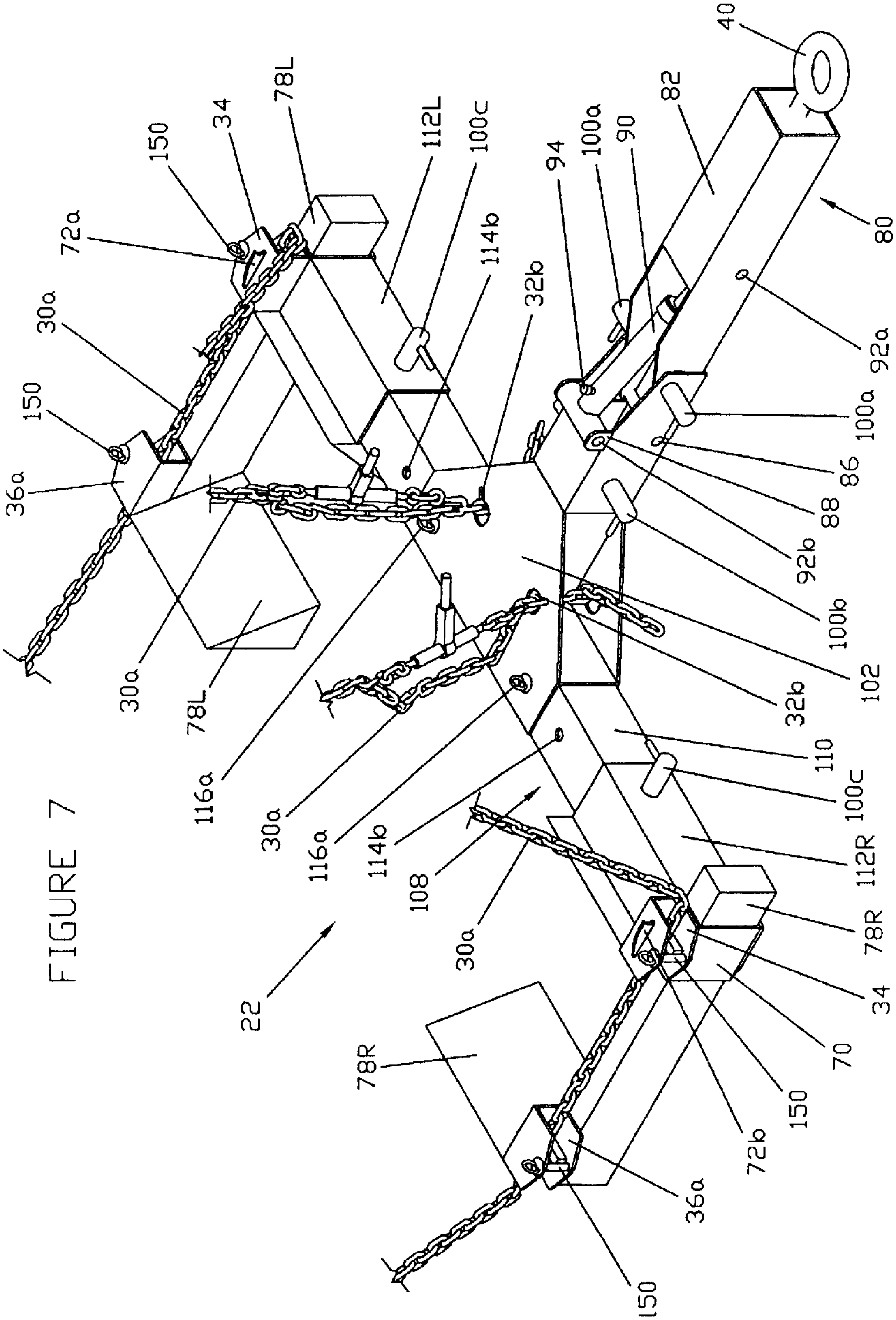
FIG. 7 is a perspective view of a second hitch device, a second embodiment of the present invention, showing a hinged single arm tongue with hitch assembled in transport position and with adjustable wheel chocks on its transverse beam and chains maneuvered through chain latches.
Figure 8:
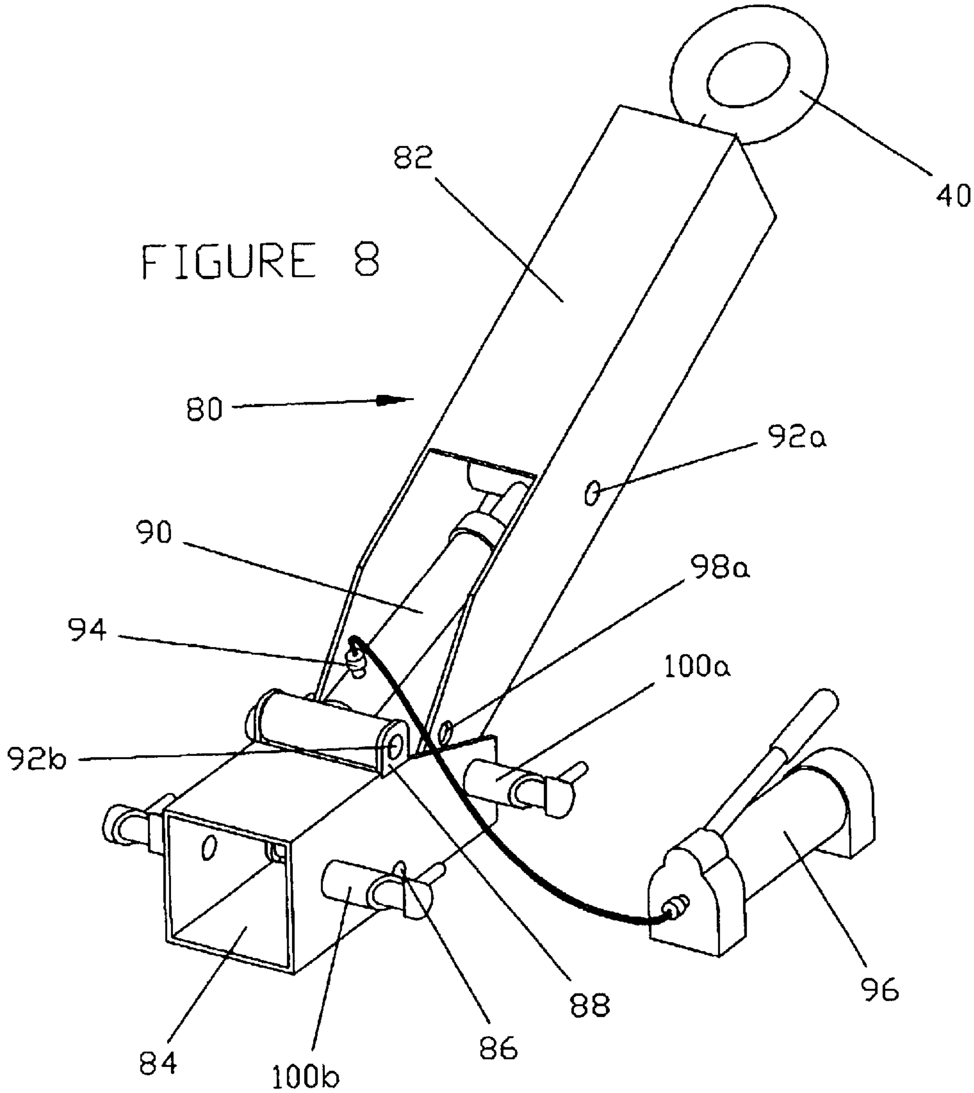
FIG. 8 is a perspective view of the hinged arm used in the second embodiment with a hydraulic hand pump attached to the arm's integral jack ram.
Figure 9:
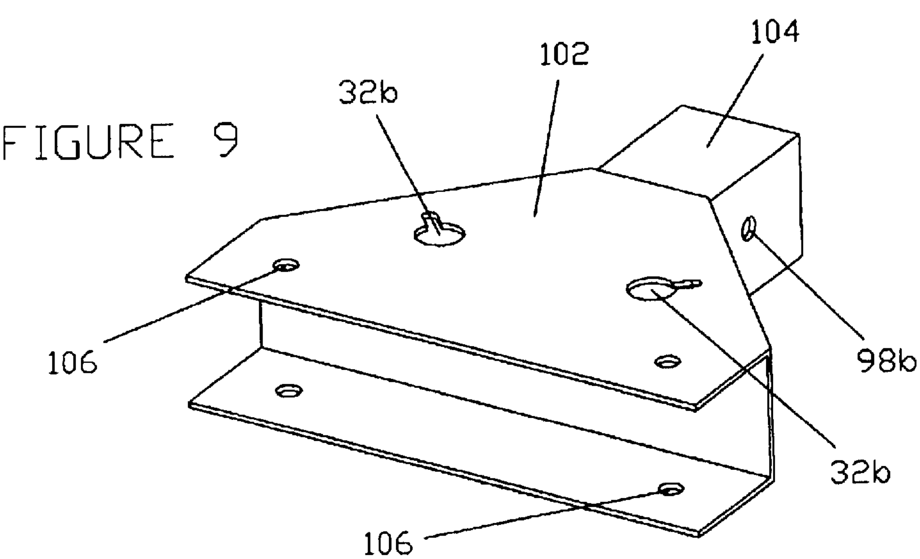
FIG. 9 is a perspective view of hitch housing used with the hinged arm of the second embodiment.

Second Embodiment—FIGS. 7–9

FIG. 7 shows a perspective view of a second embodiment. A second hitch device 22 incorporates an integral lifting jack in a hinged arm and offers an alternative method for transporting operable vehicles behind rental trucks, larger motor homes, and tow trucks without other lifting equipment. It is comprised of a tongue arm assembly 80, a second hitch housing 102, and a second beam assembly 108. Leg assemblies 78L & R telescope within sockets 70 as in the first hitch device 20 and chains 30a follow the same attachment scheme. Adjustable wheel chock assembly 112L & R telescope over an end of transverse beam 110 and can be locked at a selected width by plunger locks 100*c*. Each assembly is comprised of a second chain latch 34, a socket 70, and a chain binder anchor 72*a*. Leg assembly 78L & R incorporating a wheel chock and a third chain latch 36*a* is inserted into respective sockets 70 as with first hitch device 20. Chains 30*a* are attached to the same chassis anchors and course through chain latches in the same manner as that described for first hitch device 20.

FIG. 8 shows a perspective view of tongue arm assembly 80 with hinge pin 86 connecting hinged arm 82 to socket and hinge 84. A jack ram 90 is pivotally mounted between jack ram pivot pin 92*a* within arm 82 and pivot pin 92*b* secured to jack ram brackets 88 on socket and hinge 84. Jack ram 90 selectively connects to a hydraulic hand pump with hose 96 by coupler 94 for raising or lowering the hitch. Plunger locks 100*a* engage lock holes 98*a* in each wall of hinged arm 82 and make arm assembly 80 rigid for towing. The hydraulic hand pump with hose 96 is removed and stored for towing. Jack ram illustrated is 10-ton capacity auto body frame repair equipment. Vendors offer hand, foot, and compressed air powered pumps to use with jack rams.

FIG. 9 shows second hitch housing 102 with first chain latches 32*b* integrated into the top plate. Mounting lug 104 uses lock holes 98*b* to engage plunger locks 100*b* to connect socket and hinge 84 to its front. Second beam assembly 108 is connected to hitch housing 102 by second pins 116 inserted through flange holes 106 aligned over beam attachment holes 114*a*. Mounting lug 104 may be fixed as illustrated or pivotally mounted on a vertical axis within second hitch housing 102 and selectively released to provide limited movement for ease of alignment with vehicle axle. Other versions of second hitch device 22 may attach tongue arm assembly 80 directly to second beam assembly 108 without using a second hitch housing 102.

Operation of second hitch device 22 differs in sequence from hitch device 20 because the first embodiment moves the hitch to the vehicle, the second embodiment is expected to be first attached to the tow truck and it is preferred that operable vehicles be driven to the hitch device. Hitch 40 is used as a first hinge at the tow truck. Tongue arm assembly 80 folds as a second hinge so that socket and hinge 84, second hitch housing 102, and second beam assembly 108 rest on the ground. Towed vehicle 28 is maneuvered to the device so that vehicle axle 29 is parallel to second beam assembly 108 and tires are in contact with it. Leg assemblies 78L & R are inserted into respective sockets 70. Chains 30*a* are each attached in the same manner as in first hitch device 20 and secured within third chain latches 36*a*, second chain latches 34, and first chain latches 32*b* using the same attachment scheme and sequence as described for first hitch device 20.

Second hitch device 22 can be moved to the towed vehicle by equipping the hitch with fixed caster wheels attached to accessory legs inserted through sockets 70 and secured there so hitch can be maneuvered at low speeds over smooth terrain. A selective horizontal pivot on distal end of tongue arm 80 can simplify final alignment between second hitch device 22 and vehicle axle 29. Accessory legs are removed from sockets 70 and replaced with leg assemblies 78L & R and chains 30*a* are attached in the same manner as in first hitch device 20.

Towed vehicle 28 is raised with second hitch device 20 to towing position by operation of hydraulic hand pump 96 to extend jack ram 90 forcing hinged arm 82 downward until tongue arm assembly 80 is straight and arm is locked there by plunger locks 100*a* engaged into plunger lock holes 98*a*. A variety of different mechanical locking devices can be used to hold hinged arm when loaded and can function either as primary or secondary load supports to jack ram instead of the illustrated plunger locks. Hydraulic hand pump 96 is separated from jack ram 90 at hose coupler 94 when arm is locked and pump is stored.

Figure 10:
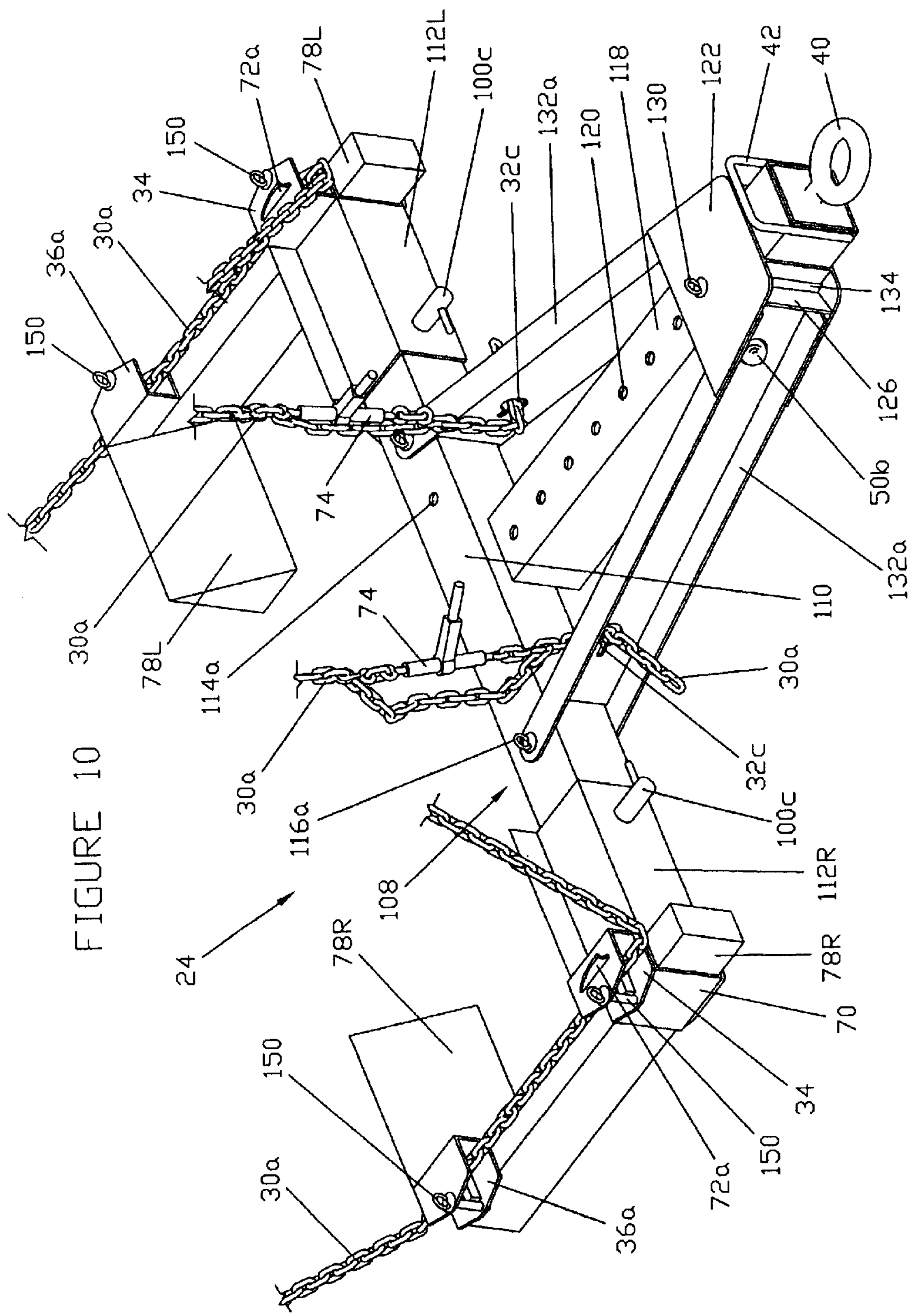
FIG. 10 is a perspective view of a third hitch device, a third embodiment of the present invention, with a four part assembled tongue that provides selective tongue length combined with a transverse beam with adjustable width wheel chocks and chains secured in chain latches.
Figure 11:
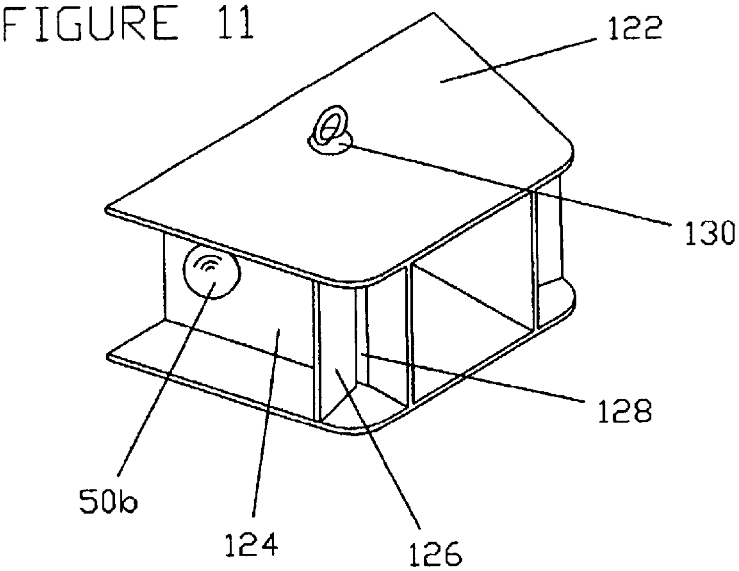
FIG. 11 is a perspective view of hitch housing that, by joining three tongue arms, provides a selective length tongue used with either third or fourth embodiments of this invention.
Figure 12:
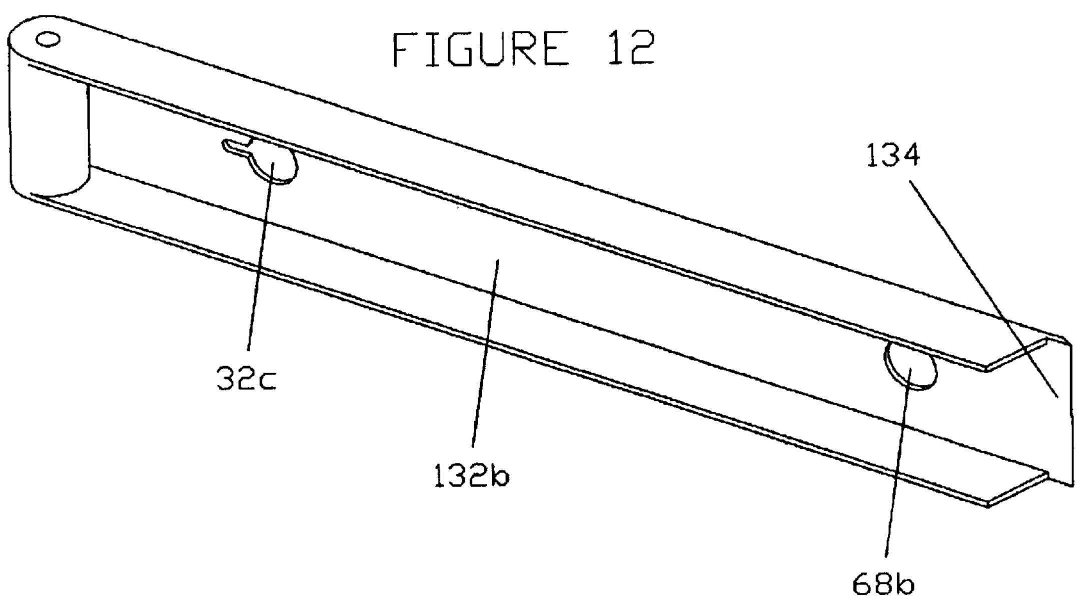
FIG. 12 is a perspective view of second arm used with fourth embodiment of the present invention showing the manner of attachment to the hitch housing.

Third Embodiment—FIGS. 10–12

FIG. 10 shows a perspective view of a third hitch device 24. It shares telescoping second beam assembly 108 and leg assemblies 78L & R with second hitch device 22. An assembled tongue makes third hitch device 24 adjustable for length to accommodate a greater variety of vehicles that commercial towing use may demand. A first arm 118 telescopes within a third hitch housing 122, fixed at a selected length by first pin 130 into any of a series of first arm adjustment holes 120. Second arms 132*a* engage third hitch housing 122 in channels 124, shown in FIG. 11, formed along its outer walls. Bosses 50*b* fixed within channels 124 engage boss latch hole 68*b*, shown in FIG. 12, to locate second arms 132*a* laterally. Webs 126 form slots 128 into which cleats 134 are inserted to hold the front of second arms 132*a* in channels 124. At their distal ends second arms 132*a* are secured against the outer walls of third hitch housing by second pins 116*a* fastening attachment lugs of second arms to transverse beam 110 through beam attachment holes 114*b*.

FIG. 11 shows third hitch housing 122 used in third and fourth embodiments including spherical boss 50*b* in channel 124 and web 126 forming slot 128.

FIG. 12 shows details of second arm 132*b* with cleat 134 extending to its front, boss latch hole 68*b*, and first chain latch 32*c*. Arms are symmetrical to facilitate assembly of hitch device. Second arm 132*a* with lugs is used with adjustable width beams. Hitch device 26, Embodiment 4, and variations of hitch device 24 may use this preferred second arm 132*b*.

Operation of this embodiment is similar to that described for first hitch device 20 but varying in the assembly of the arms of the hitch. Components in this embodiment can be of a size and weight that can be handled by an average person. Components are mostly symmetrical for convenience of assembly. Four-piece tongue is assembled onto transverse beam 110 by using a second pin 116*a* to hold a second arm 132*a* to beam at an attachment hole 114*b*. Third hitch housing 122 is installed onto that second arm 132*a* with cleat 134 inserted into slot 128 and boss latch hole 68*b* engaged over boss 50*b*. The remaining second arm 132*a* is next attached to third hitch housing 122 in a similar manner. The partially assembled tongue is rotated rearward so that lugs at the distal end of second arm 132 can be attached to transverse beam 110 by another second pin 116*a* through a second attachment hole 114*b*. Pins 116*a* lock all components in place. First arm 118 is installed into the front of third hitch housing 122 and pinned using first pin 130 through housing and one of the series of first arm adjustment holes 120.

Wheel chock assemblies 112L & R are installed over ends of transverse beam 110 and latched in place using plunger locks 100*c*. Leg assemblies 78L & R are inserted into sockets 70 and chains 30*a* are maneuvered as described in the previous embodiments. A fixed width transverse beam 136 may be used in place of telescoping beam assembly 108 in this embodiment. It is illustrated in FIG. 13 as a third transverse beam in the fourth embodiment of the present invention and is compatible with leg assemblies 78L & R and second arms 132*b*.

Figure 13:
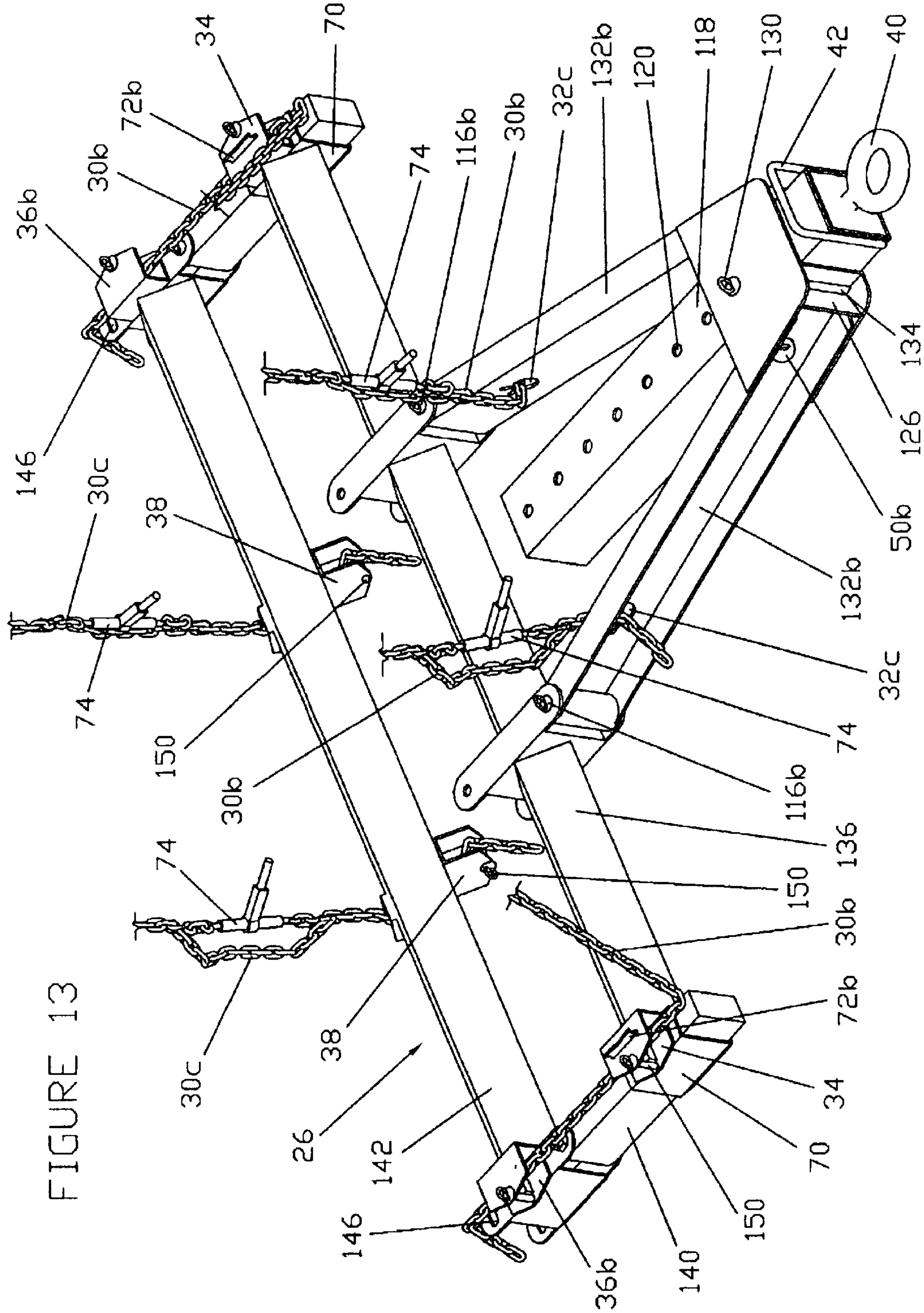
FIG. 13 is a perspective view of fourth hitch device, a fourth embodiment of the present invention, showing a tongue of adjustable length used with two transverse beams as front and rear wheel chocks for towing trucks having fuel tanks and other equipment mounted outside frame rails and chains and chain load binders positioned for securing hitch device to truck chassis.

Fourth Embodiment—FIG. 13

FIG. 13 shows a fourth embodiment, a fourth hitch device 26 that uses a different attachment scheme to towed vehicle 28 from previous embodiments. Because heavy trucks have fuel tanks and other equipment mounted outside frame rail, it may be impossible to route chains directly from truck chassis to chain latches mounted outside on rear wheel chocks. Fourth hitch device 26 uses two chains rather than one on each side of towed vehicle.

It shares the adjustable tongue with third hitch device 24 in which first arm 118 telescopes in third hitch housing 122 and can be pinned at a selected length using first pin 130 through one of the first arm adjustment holes 120 and is assembled in a similar manner. A variation of hinged arm 80 used with second device 22 may be used instead of first arm 118 in this embodiment. The hinged arm may have multiple jack rams and provides fourth hitch device 26 the option of integral lift capability within this embodiment of the hitch device.

Second arms 132*b* are attached to third hitch housing 122 as described for the third embodiment. Second pins 116*b* fasten second arms 132*b* to third beam 136 at beam mounting brackets 138, thereby also securing assembled hitch. Sockets 70 are fixed to each end of third beam 136 with a second chain latch 34 and load binder anchor 72*b* fixed to the top surface of each of sockets 70. Third beam 136 is diamond shaped with either upper surface serving as wheel chocks.

Lateral legs 140 are installed into sockets 70 from the front or rear and are pivotally attached to a diamond shaped fourth beam 142 by third pins 148 through pin slots 146 and through gudgeons at the rear of lateral legs 140. Fourth beam 142 has third chain latches 36*b* fixed to the top of each end and several fourth chain latches 38 fixed to each lower face to align with standard truck frame width. Third beam 136 and fourth beam 142 are of symmetrical construction for ease of assembly.

In operation arms of fourth hitch device 26 are assembled in the same manner used with third hitch device 24. After arms are attached to third beam 136, the tongue and transverse beam is maneuvered in front of vehicle axle 29. Fourth beam 142 is maneuvered into a parallel position behind vehicle axle 29. Lateral legs 140 are inserted through sockets 70 on third beam 136 and attached to fourth beam 142 using pins 148 in slots 146.

Second chains 30*c* are connected to fourth chain latches 38 fixed to front lower faces and pass under fourth beam rearward and then upward to truck frame. First chains 30*b* connect third chain latch 36*b* and second chain latch 34 capturing wheels on vehicle axle assembly 29 between third beam 136 and fourth beam 142. As in previous embodiments chains 30*b* are drawn tight by chain load binders 74 anchored to load binder anchors 72*b* and latched into second chain latches 34, and chain load binders 74 are removed. Chains 30*c* can be pulled tight as fourth beam is pulled toward third beam or alternately can be made and held taut by using a second pair of chain load binders 74 on chain 30*c* between forth beam and truck chassis. Fourth beam 142 functions as wheel chocks and connects and reroutes chains 30*c* to 30*b* to avoid equipment and tanks mounted outside truck frame.

Lateral legs 140 serve as levers to neutralize the opposing torque forces between the hitch tongue attached to third beam 136 and the chassis anchor chains attached to fourth beam 142 allowing said beams to serve as wheel chocks to stabilize vehicle axle assembly 29 and carry axle load through the tongue to hitch 40. The hitch never pivots under the towed vehicle with the present invention. That allows the load to be carried lower because little clearance above the hitch is needed to minimize damage to any towed vehicle.

Conclusion, Ramifications, and Scope of Invention

The present invention provides wheel lift hitches with a universal attachment scheme for all vehicles having at least four wheels on at least two axles. It is adaptable to different embodiments of the hitch device because of its componential design. Components can be created from vendor supplied standard forms and some specialized hardware items. Components are ideally of a size to be handled by one or two persons but can be of any size. Transverse beams can be of either single piece or three-piece construction in all but the basic embodiment. Most components can be made symmetrical to facilitate quicker assembly in the less than ideal conditions encountered by users.

Figures illustrate only lunette eye hitches but any hitch with an adequate vertical load capacity may be used including but not limited to ball hitches, fifth wheel hitches, inverted fifth wheel hitches, and gooseneck hitches. Because first and second arms of the telescoping tongue do not need to connect on the same plane, a gooseneck hitch can be incorporated into the design by using a modified hitch housing to mount first arm of the towing device at the desired hitch height above second arms to accommodate a hitch arm that functions as a gooseneck hitch. The required height of a gooseneck hitch housing can incorporate a design that includes a jack to raise the hitch so no external lifting device would be needed.

Drawings show only the use of chains and chain load binders in the present invention. It is recognized that axle straps, recovery straps, and cargo straps in combination with strap winches provide alternatives to the use of chains and offer benefits over chains. Strap winches provide a longer take up length before re-hooking chains compared to chain load binders and may often be substituted for them. Straps distribute load over a wider area compared to chains and may be preferable for attachment of hitch device to suspension if anchor points are damaged or missing.

Lock pins 150 that prevent chains from slipping out of lock latches may be interchanged with long hasp padlocks using lock holes 152. Flap latch used in the basic embodiment may also be made to accept a padlock for added security for the hitch device. Such safeguards may prevent vandalism to a loaded but unattended unit and possibly prevent a road accident.

The present invention, compared to car dollies and bumper hitches for four-wheel towing, carries a heavier hitch load that requires a higher capacity tow truck. This makes towing safer because the loaded tow truck is heavier than the towed vehicle. Braking is improved because more weight is carried on axles with working brakes. The combination can also be backed up.

The present invention, compared to wheel lift wrecker trucks and car carriers with wheel lift hitches, is superior because the load is carried closer to the rear axle of the towing vehicle. This reduces the leverage the towed vehicle has on the tow truck in both horizontal and vertical planes and reduces the front axle weight transferred to the rear axle to balance the load. This provides the means for tow trucks using this hitch to be shorter, lighter weight, yet more stable when towing.

The present invention can be used with conventional self-loading towing dollies. Chains can be attached directly to the dollies instead of to the vehicle chassis for use with this device. It is recognized that some manufacturers use removable eyebolts to provide anchors during transport. A few vehicles may have no integral anchor points provided by the manufacturer between the axles. Towing dollies, carrying vehicle wheels restrained within the dollies, provide a towing solution for that and similar situations such as corroded or torn anchor points in vehicle chassis.

It is expected that a future version of the present invention will incorporate a truck-mounted active boom having selective control of movement on both horizontal and vertical axes in place of the passive tongue in the present invention. A six-way boom including an extension function, selectively controlled by the operator, will lift, carry, and maneuver wheel lift and may function as a conventional wheel lift during attachment. It may then be selectively released to act as a tongue attached to a towed vehicle for highway towing. Such a system will require an attachment scheme for the towed vehicle similar to the scheme introduced in the present invention. Such a system will lead to the development of compact and agile tow trucks with equal or greater towing capacity compared to present state of the art units.

It should be understood that a wide range of changes and modifications could be made to the preferred embodiments described above. It is therefore intended that the present invention not be limited to the embodiments described above, but encompasses any and all embodiments with the scope of the following claims and equivalents thereof.

I claim:

1. A wheel lift device forming a rigid tongue for hitching a vehicle to a tow truck, and pulling said vehicle on a trailing axle, said device comprising:

(a) a tongue having arms rigidly connecting a hitch to a transverse beam;

(b) said arms having first chain latches;

(c) said beam having arm mounting brackets, first wheel chocks, second chain latches and sockets for holding legs;

(d) said legs having second wheel chocks and third chain latches;

(e) means for releasable attaching said vehicle to said wheel lift device for towing;

(f) wherein said tongue further comprises a hitch housing with a hitch and a locking wedge;

(g) wherein said arms are foldable parallel and against said beam;

(h) said arms when unfolded engage said housing to form a rigid triangular tongue.

2. A rigid wheel flu device as defined in claim 1 wherein said legs further comprise: lateral elements to support said second chocks;

a means to secure a wheel of said vehicle between said first and second chocks.

3. A rigid wheel lift device as defined in claim 1, wherein the attachment means comprises a chain attached to an anchor point on said vehicle and coursing through said chain latches, thereby attaching said vehicle to said rigid wheel lift device.

4. The device according to claim 1, the tongue further comprising:

(a) bosses fixed to the inner walls of said housing;

(b) latch holes in said arms for engaging said bosses;

(c) wherein said arms are releasably engaged with said housing via said locking wedge.

5. The hitch housing as defined in claim 4, further comprising:

(a) said housing having a trapezoidal shape;

(b) plates forming the top and bottom of said housing;

(c) means for rigidly attaching said arms to said housing.

6. A device according to claim 1, wherein said wedge, secured by a spring and latch, holding said arms onto said bosses within said housing, providing a means to assemble said device without tools by using integral fasteners.

* * * * *